March 22, 1932.   L. H. CHURCH   1,850,533
CABLE CONNECTER
Original Filed April 2, 1926
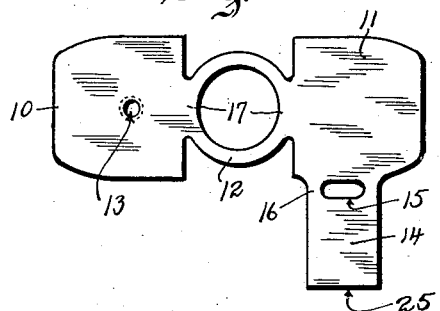
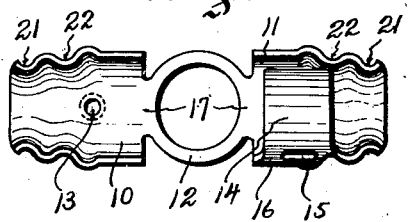
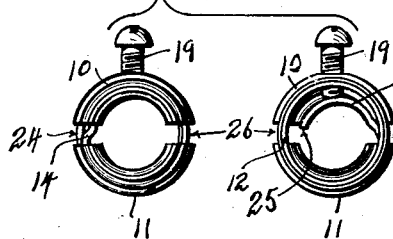
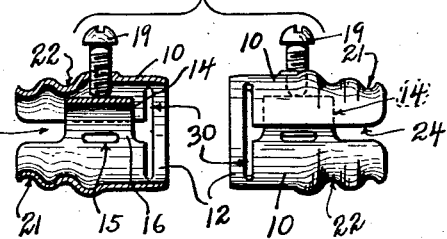
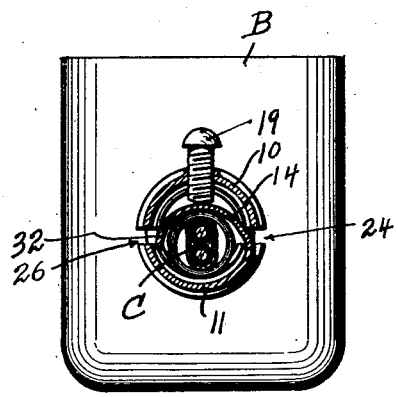
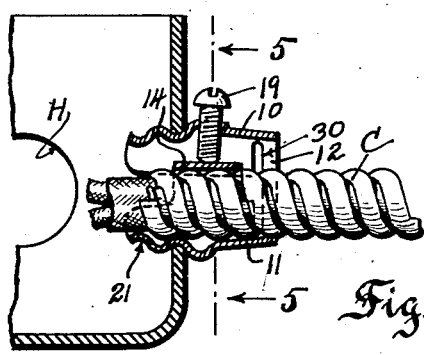
INVENTOR
Lewis H. Church
BY
Bohleber & Ledbetter
ATTORNEYS Patented Mar. 22, 1932

1,850,533

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Original application filed April 2, 1926, Serial No. 99,204. Divided and this application filed December 31, 1926. Serial No. 158,146.

This invention relates to cable connecters used in anchoring cable to electric outlet boxes and the like, and relates in particular to a connecter capable of anchoring various sizes and shapes of cable to outlet boxes.

This application is a division of U. S. application Serial Number 99,204, filed April 2nd, 1926.

The object of this invention is the provision of a cable connecter having an improved cable bearing clamp plate by which pressure from the connecter operating means is delivered to the cable and by which the operating means is prevented from crushing or mutilating the cable. Accordingly the bearing clamp plate is coupled, hinged, or otherwise joined within a cable connecter sleeve along an axis parallel to the axis of the sleeve or cable, and is disposed transversely of or over a cable inserted in the sleeve.

More particularly, a connecter sleeve having an expansible end for anchoring it in the box hole or any other suitable form of box hole anchorage means, is longitudinally split and carries, inside thereof as an extension of one edge of one split, a bearing clamp plate extending inwardly across the interior of the connecter for engagement by operating means, such as a screw, carried with the sleeve, the screw acting to bear on the clamp plate thereby clamping it against a cable.

The invention also has for its object the provision of a connecter which shall be easily, conveniently and cheaply manufactured. To this end the connecter member is formed from a single sheet or stamping including the novel clamp plate which is curled into the sleeve and assumes the desired shape to be engaged by the operating screw threaded through the sleeve.

These and other objects of the invention and the means for their attainment will be more apparent from the following detailed description, taken in connection with the accompanying drawings illustrating an example thereof, in which:

Figure 1 shows a flat sheet metal stamping or blank from which the connecter is fashioned; and Figure 2 shows the sleeve plates and bearing clamp plate of the blank as having been pressed into curvilinear form.

Figure 3 shows end views of the connecter, looking from both ends thereof.

Figure 4 shows respectively a longitudinal sectional and side elevational view of the completed connecter.

Figure 5 is a box assembly view showing an armored cable anchored within a hole or knockout opening in an outlet box by means of the improved connecter which is shown as sectioned on the line 5—5 of Figure 6; and Figure 6 is a sectional view of the box assembly.

Electric outlet boxes B are made with knockout openings or holes H to receive the cable C to be anchored therein by cable connecters and the insulation covered wires W are manipulated inside the box B to make electrical connections in the usual way.

There is shown in Figure 1 a sheet metal blank comprising spaced sleeve plates 10 and 11 formed integrally with a connecting portion or annulus such as the cable entry ring 12 or sleeve end ring. One of the sleeve plates say 10 is tapped as at 13 for the reception of operating means, i. e. the screw 19 which acts as operating means to simultaneously anchor the connecter in a box hole and secure a cable in the connecter.

The other plate 11 includes a bearing clamp plate 14 defined by an elongated hole 15 punched therein as weakening means. Thus the cable clamp plate 14 is attached to the sleeve plate 11, the clamp plate being thus connected to the sleeve plate by bending or hinge necks 16 so as to be easily bent relative to the plate 11. The clamp plate is carried by one of the lengthwise edges of the sleeve plate and the slot 15 forms one side or edge of the sleeve.

The flat plate or blank of Figure 1 is shown in Figure 2 as having been submitted to a forming or pressing operation which shapes the flat sleeve plates 10 and 11 to substantially semi-cylindrical portions and furthermore curves the bearing clamp plate 14 inwardly toward the plate 11 but on a smaller radius of curvature than that of plate 11. The curved sleeve sections or portions 10 and 11 are then caused to approach one another by bending them together along or at the necks 17 to form a generally cylindrical or sleeve type connecter member through which a cable may pass underneath the bearing clamp plate 14.

Figures 3 and 4 show the connecter in its completed form. Operating means, such as the screw 19, is threaded into the tapped hole 13 and the lower end of the screw ordinarily seats against the clamp plate 14. It is to be noted that the screw is carried in one sleeve plate 10 while its end bears against the bearing clamp plate 14 flexibly hinged preferably to the other sleeve plate 11, and by running the screw inwardly the bearing clamp plate 14 is driven into the connecter passage to engage and partly surround the cable C inserted in the sleeves 10 and 11.

While one of the features claimed in the copending application was an improved box hole anchorage means applicable to knockout openings of different sizes and while the same series of grooves or corrugations 21 and 22 are here illustrated in the drawings, it is to be understood that the invention is not limited to any particular type of box hole anchorage means but that any other means to anchor the connecter in a box hole may be adopted. As illustrated, the box hole anchorage means comprise several annular grooves 21 and 22 of a plurality of sizes capable of accommodating the sleeve connecter and anchoring to as many different size box holes.

The punched opening 15 hereinbefore mentioned interrupts one of the corrugations defining the larger box hole groove 22 and by reason thereof breaks the rigidity imparted by said circular corrugation and therefore causes the flexible clamp plate 14 to be joined onto the rigid corrugated sleeve portion 11 at the terminus of the corrugated and grooved structure.

It is to be noted that the bearing clamp plate 14 lies transversely of the axis and tends to wrap around the cable C with considerable pressure when brought down to engagement therewith under action of the operating screw 19. By forming the cable clamp plate 14 transversely of the cable axis, the manufacture of the blanks and the complete sleeve connecter 10—11 is facilitated and the transverse bearing clamp 14 aids in closing the connecter sleeve 10—11 around the cable C. Furthermore, the clamp plate 14 serves to close the split 24 formed by the proximate edges of the sleeve plates 10 and 11 and prevents the admission of plaster. When smaller size cable C is anchored in the box B, the end 25 of the clamp plate 14, when the clamp plate 14 is depressed by the screw 19, serves to also close the other sleeve split 26.

While it is to be understood that any type of box hole anchorage may be availed of, it is obvious that the movement of the screw 19 against the clamp plate 14 seated on a cable C serves to react and expand the sleeve 10—11 and is thus effectual in expanding the box hole anchorage groove or grooves 21 or 22 within the knockout opening H and thus fix the connecter in a box and secure a cable therein.

It is now seen that a cable connecter is produced which includes oppositely arranged T-shaped slots, the longitudinal slots 24 and 26 bisecting its respective radial slot 30. From out of one of the longitudinal slots as 24 there comes the pivotal bearing clamp plate 14 arching over the cable inside the sleeve beneath the operating means 19. The clamp plate hingedly operates parallel to the radial slots 30, and it is the latter slots which define the sleeve bending necks 17 to permit connecter expansion and consequent anchorage in a box hole.

The two slots 24 and 26 are in effect closed by the laterally movable cable clamp plate 14 for its end 25 can if desired be made long enough to wrap over the cable C within the sleeve and intercept the opposite slot 26 as shown in Figure 5 and indicated by the reference character 32 designating an extra long curved end on the clamp plate 14, the result of which is to cause the lengthwise slot 26 to be overlapped inside to cover it against entry of dirt or plaster.

The curved cable bearing clamp plate 14 together with the sleeve section 11 may be considered as forming a variable size cable receiving sleeve 11—14 and this sleeve is variable in size to receive any size cable. On the other hand the sleeve 10—11 functions as a box hole sleeve to fit into a box hole H. Thus there are two sleeves, virtually one within another, the outer sleeve forming as it does, a part of the inner sleeve.

The outer or box hole sleeve fits into any size box hole within its range while the inner or cable receiving sleeve fits any cable within its range. Thus the two interrelated sleeves working together take any size cable and any size box hole.

What I claim is:

1. A connecter comprising, a longitudinally split connecter member, box hole anchorage means therefor, a bearing clamp plate hinged to the connecter along one edge of a split, and operating means to move the bearing clamp plate against a cable and to expand the box hole anchorage means.

2. A connecter comprising, a connecter member having diametrically disposed longitudinal splits, box hole anchorage means therefor, a curved bearing clamp plate hinged to the connecter along one edge of one split and extending across the interior of the member, and operating means to force the bearing clamp plate against a cable and to expand the box hole anchorage means.

3. A connecter comprising, a connecter sleeve having diametrically disposed longitudinally extending splits, box hole anchorage means therefor, a curvilinear bearing clamp plate hinged to the connecter along one edge of one split and extending across the interior to the other split, and operating means to move the bearing clamp plate against a cable and substantially close the second named split and to expand the box hole anchorage means.

4. A connecter formed from a flat stamping including a pair of spaced sleeve plates united by a connecting annulus and a bearing clamp plate integral with one sleeve plate and bendable thereon along a perforated line parallel to the longitudinal axis of the sleeve plates, said sleeve plates being pressed into a generally cylindrical sleeve formation with the bearing clamp plate curved therewithin on a shorter radius than that of the sleeve, one of said plates being tapped to receive an operating screw to bear on the clamp plate.

5. A connecter comprising, a flat stamping including a pair of spaced sleeve plates integrally joined by a connecting portion, a flat clamp plate integral with one sleeve plate and bendable thereon along an axis parallel to the longitudinal axis of the sleeve plates, said sleeve plates being pressed into circular formation and bent together over the connecting portion to produce a sleeve, said clamp plate being curved inside the sleeve on a shorter radius than that defined by the sleeve, a screw mounted in one sleeve plate and bearing against the clamp plate, and box hole anchorage means carried with the connecter end opposite the connecting portion and rendered effective by the operation of the screw and clamp plate.

6. A connecter comprising, a sleeve provided with T-shaped slots including circumferential and lengthwise slits which form sleeve sections joined at one end by a ring and expansible at the other end, box hole anchorage means carried with the connecter expansible end, a cable clamp plate integral with one sleeve section along a lengthwise slit and projecting through that slot and over a cable passage therein, said sleeve and clamp plate having a weakening slot in line with the lengthwise sleeve slit and forming a bending neck by which the clamp plate is integral aforesaid with the sleeve, and operating means carried with the connecter adapted to bear on the clamp plate and expand the box hole anchorage means.

7. A connecter comprising, a sleeve provided with opposed circumferential slots proximate one end thereof forming a ring and opposed necks integral with the ring, opposed lengthwise slots bisecting the circumferential slots between the necks and forming opposed expansible sleeve sections each of which is integral with a neck aforesaid, a clamp plate joined by a bendable neck to one edge of a sleeve section and projected through the adjacent lengthwise slot into the sleeve and movable therein parallel to the plane of the radial slots, box hole anchorage means carried with the expansible sleeve sections, and operating means adapted to force against the clamp plate and expand the anchorage means.

8. A connecter comprising a member including a plurality of box hole anchorage means of different sizes adapted to fit into box holes of different sizes, a clamp plate hinged at one end thereof to the member and free at the other end to clamp against different size cables and to protect the cable against mutilation by the operating means, and operating means to apply pressure to the clamp plate thereby clamping the cable to the connecter and expanding the anchorage means in the box opening.

9. A connecter comprising a member including a plurality of box hole anchorage grooves graduated in different sizes adapted to fit into box holes of different sizes, a clamp plate integrally hinged to the member to clamp against different size cables and to protect the cable against mutilation by the operating means, and operating means to apply pressure to the clamp plate and expand all the anchorage grooves thereby clamping the cable to the connecter and expanding the anchorage means in the box opening.

10. A connecter comprising a member including graduated box hole anchorage means, a clamp plate hinged at one end thereof to the member on a line parallel to the axis of the connecter adapted to clamp the cable and protect it against being crushed by the operating means, and operating means carried with the member to apply presure to the clamp plate.

11. A connecter comprising an expansible sleeve formed with a plurality of graduated in size box hole anchorage grooves, a cable clamp plate joined to the sleeve along a bending axis parallel to the sleeve axis and extending transversely over a cable when inserted in the sleeve adapted to clamp the cable and protect it against being crushed by the operating means, and operating means to actuate the clamp plate and expand the sleeve and anchorage grooves.

12. A connecter comprising a sleeve slotted on opposite sides and formed with a plurality of graduated in size box hole anchorage grooves, a cable clamp plate adapted to clamp the cable and protect it against being crushed by the operating means and carried with the sleeve and attached thereto along an edge of one slot and extending across the interior to the other slot, and operating means for the clamp plate and to expand the sleeve.

13. A connecter comprising a sleeve slotted on opposite sides forming expansible sleeve sections and formed at one end with a plurality of box hole anchorage grooves graduated in diameter and including a ring at the other end integrally joined to the sleeve sections, a cable clamp plate adapted to clamp the cable and protect it against being crushed by the operating means and carried with the sleeve along one edge of one slot and extending across the interior of the sleeve to the other slot, and an operating means to actuate the clamp plate whereby cable of different diameters may be clamped and to expand the graduated size grooves.

In testimony whereof I affix my signature.

LEWIS H. CHURCH.